United States Patent [19]

Mansilla Anguera

[11] Patent Number: 4,771,809
[45] Date of Patent: Sep. 20, 1988

[54] ROTARY HYDRAULIC DISTRIBUTOR AND PROCESS FOR THE ASSEMBLY OF SUCH A DISTRIBUTOR

[75] Inventor: Narciso Mansilla Anguera, Barcelona, Spain

[73] Assignee: Bendix Espana S.A., Barcelona, Spain

[21] Appl. No.: 52,636

[22] Filed: May 20, 1987

[30] Foreign Application Priority Data

May 22, 1986 [ES] Spain ............................. 555222

[51] Int. Cl.⁴ ............................................. F15B 9/10
[52] U.S. Cl. ............................. 137/625.21; 91/375 R; 403/282
[58] Field of Search ............... 137/625.21; 91/375 R, 91/375 A, 467; 180/132, 148; 403/326, 282, 281, 373, 360

[56] References Cited

U.S. PATENT DOCUMENTS 4,417,651 11/1983 Lu ................................ 403/282 X
4,527,591 7/1985 Barcardit ...................... 91/375 R

FOREIGN PATENT DOCUMENTS 2486897 1/1982 France ........................... 180/132

Primary Examiner—Edward K. Look
Attorney, Agent, or Firm—Larry J. Palguta; Ken C. Decker

[57] ABSTRACT

The two stator members of the distributor (5, 6), between which the rotor of the distributor (10) is placed, are assembled under an axial prestress by an assembly tie rod (12) comprising, at one end, an annular shoulder (17) cooperating in bearing against a bearing surface of the adjacent stator member (5) and, at its other end a profiled annular groove (18) in which a metal ring (23) is fitted by force, under axial stress with radial deformation, so as to exert an axial stress on a radial bearing surface of the adjacent stator member (6). Application to the construction of rotary hydraulic distributors, especially for power-assisted vehicle steering systems.

10 Claims, 2 Drawing Sheets

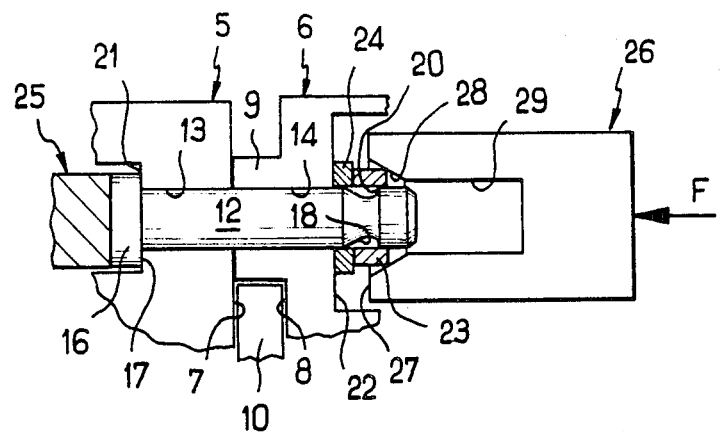
FIG_4
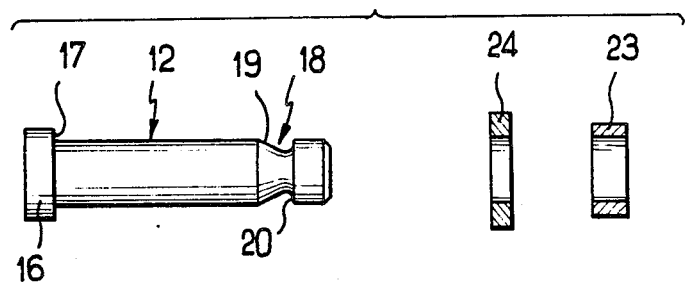
FIG_2
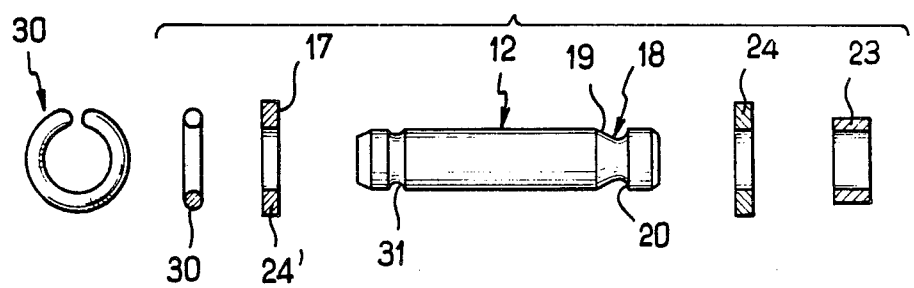
FIG_3a        FIG_3

ROTARY HYDRAULIC DISTRIBUTOR AND PROCESS FOR THE ASSEMBLY OF SUCH A DISTRIBUTOR

The present invention relates to rotary hydraulic distributors of the type comprising a rotor coupled rotationally with an input member and mounted rotationally between axially opposite faces of a first and a second stator members which are assembled, under axial prestress, by at least one elongate assembly member extending axially in aligned passage openings of the first and second stator members, the assembly member comprising, at a first end, an annular shoulder cooperating in bearing with the bearing surface of the adjacent stator member.

A hydraulic distributor of this type is described in the document EP-A-0,095,415, in the name of the Applicant Company, the content of which is assumed to be incorporated here for reference. In known hydraulic distributors of this type, the first and second stator members are assembled coaxially by means of at least one bolt whose head forms the annular shoulder cooperating in bearing with the adjacent stator member, and whose threaded end is screwed into the passage opening of the other stator member, which must consequently be tapped. An arrangement of this kind is found to be relatively costly, both insofar as the manufacture of the members employed (bolt, tapping of the passage opening of one of the stator members) is concerned, and insofar as the assembly of the distributor is concerned, the latter being a relatively fragile unit and consequently requiring a highly qualified work force, particularly bearing in mind the accuracy required for the clamping torques. Because of the very high fluid pressures employed in such distributors and to ensure a leak-free stator assembly, the threads of the bolt and of the tapped opening must, furthermore, have a fine pitch and must extend over a relatively large axial distance, and this presents problems not only of accuracy but also of mechanical strength, insofar as the stator members are in most cases made of sintered metal. For these same reasons, the solution, envisaged at one time, of assembling the stator members by riveting of the assembly member has had to be set aside, because of the lack of accuracy in the application of a determined prestress to the stator members and of the low mechanical strength of the material of construction of an assembly member capable of being riveted.

According to the present invention there is provided a rotary hydraulic distributor of the abovementioned type, of robust construction, accurate and reliable, and of considerably reduced cost of manufacture and assembly.

For this purpose, according to a feature of the invention, the assembly member comprises a second end projecting axially, in assembly position, in relation to a radial bearing surface of the adjacent stator member and formed with a peripheral groove, advantageously profiled, in which a metal ring is fitted by force with radial deformation so as to exert an axial stress on the said bearing surface of the adjacent stator member and, consequently, an axial prestress on the two stator members locked between the annular shoulder and the ring inserted into the groove.

According to a more particular feature of the invention, between the ring and the bearing surface of the adjacent stator member there is inserted a bearing ring which is threaded beforehand onto the second end of the assembly member and which transfers onto the bearing surface of the adjacent stator member the axial stress exerted by the metal ring fitted by force into the peripheral groove.

An object of the present invention is correspondingly to provide a process for simple, quick and safe assembly of a hydraulic distributor of this kind, comprising the stages of introducing the assembly member into the aligned openings in the first and second stator members with its annular shoulder bearing against the bearing surface of the adjacent stator member, of positioning a stationary axial bearing against the first end of the assembly member, of placing the ring over the second end of the assembly member, substantially with overlapping of the peripheral groove of the second end of the assembly member, and of then applying a combined axial and radial force to the ring in order to fit it with deformation into the groove.

The invention will now be described by way of example with reference to the accompanying drawings, in which:

FIG. 2 shows a first embodiment of the subunit of the assembly according to the invention;

FIGS. 3 and 3a show a second embodiment of the subunit of an assembly according to the invention; and FIG. 4 is a diagrammatic view illustrating the process of assembly according to the invention employing the subunit of the assembly of FIG. 2.

In the description which will follow and in the drawings, identical or similar members bear the same reference numbers, with the addition of prime marks if appropriate.

Figure 1:
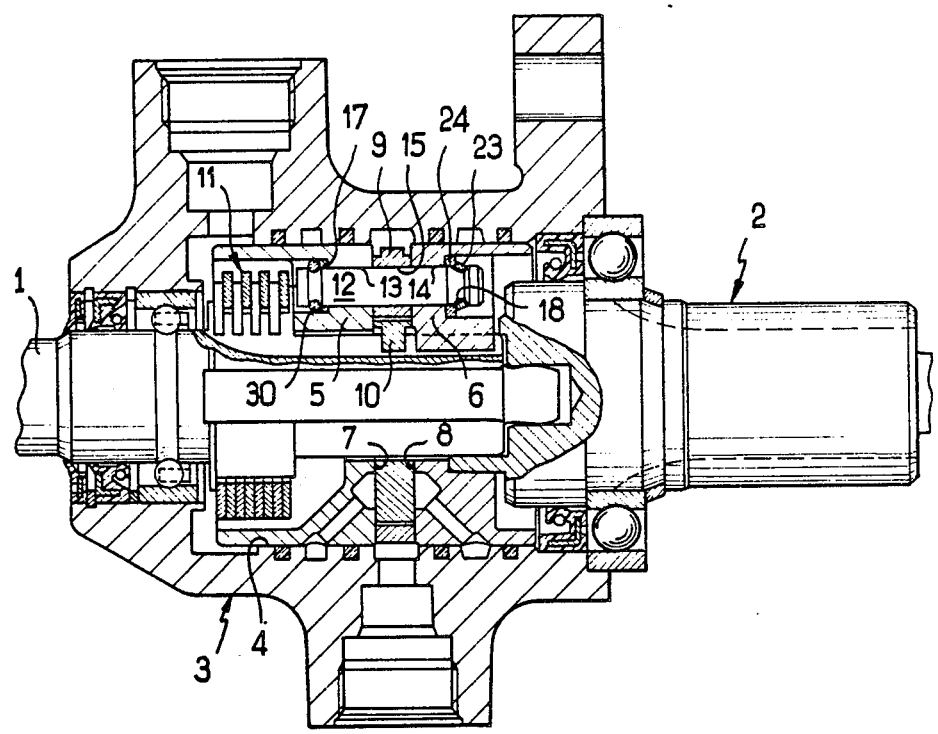
FIG. 1 is a diagrammatic view in lengthwise section of a hydraulic distributor according to the invention.

FIG. 1 shows a rotary hydraulic distributor, more particularly for a power-assisted vehicle steering system, of the type described in the abovementioned document EP-A-0,095,415. In the embodiment shown, this hydraulic distributor essentially comprises an input shaft 1 and an output shaft 2, which are coaxial, mounted on bearings in a casing 3 and intended, respectively, to be connected to a steering wheel and to an output rack (which are not shown). In a coaxial bore 4 of the casing there is mounted rotatably a stator unit coupled rotationally with the output shaft 2 and consisting of a first stator member 5 and a second stator member 6 which are coaxial and axially adjacent, which are assembled, in a manner which will be described in more detail, so as to form between them, between two axially opposite faces 7 and 8, a space of substantially discoidal shape, of an axial extent which is determined, for example, by an intermediary spacer member 9, in which space there is mounted rotatably and slidably a star-shaped discoid rotor 10 such as described in the abovementioned document EP-A-0,095,415, coupled rotationally with the input shaft 1. The input 1 and output 2 shafts are, furthermore, coupled together by a resilient reaction and centering device forming an angular application-stroke coupling consisting of a set of C springs 11, advantageously such as described in Spanish patent application No. 554,415 (ES 37), arranged typically, as shown, between the input shaft 1 and an axial extension of the first stator member 5 surrounding the input shaft 1.

In accordance with the invention, the first and second stator members 5 and 6 are assembled coaxially under an axial prestress by means of at least one, typically three assembly members or tie-rods 12 made of a material of high tensile strength, for example steel, having a cylindrical main part received in axially aligned openings 13 and 14 in the stator members (and 15 of the spacer member when the latter consists of a part which is separate from the first and second stator members).

In the embodiment shown in FIG. 2, the assembly member 12 comprises an end head 16 defining an annular shoulder 17 facing the second end of the assembly member 12, which comprises a peripheral groove 18 having typically, at the side of the cylindrical barrel portion of the assembly member, a surface 19 which is convergent in the direction towards the second end of the assembly member 12 and which comes together, via a small radius, into an annular radial shoulder 20 facing the annular shoulder 17 of the head 16.

As can be seen in FIG. 4, the stator members 5 and 6 are arranged so that the axial passage openings 13 and 14 open outwards into bearing surfaces lying in parallel radial planes 21 and 22 respectively, the assembly member 12 being sized so that, when the annular shoulder 17 bears against the bearing surface 21 of the adjacent stator member 5, the second end of the assembly member 12 projects axially out of the bearing face 22 of the other stator member 6, the annular groove 18 being, in the assembly configuration, situated completely outside this adjacent bearing face 22.

In accordance with the invention, the assembly of the stator members 5 and 6 is effected, via the assembly member 12, by means of a ring 23 intended to be fitted by force with radial deformation in the groove 18. Preferably, a bearing washer or ring 24 is threaded onto the second end of the assembly 12 beforehand, in contact against the bearing surface 22, so that, in the initial assembly configuration such as is shown in FIG. 4, the bearing ring 24 slightly overlaps axially a part of the convergent surface 19 of the groove 18. The ring 23, made typically of mild steel with a low carbon content, has an initial axial dimension which corresponds substantially to the axial span of the groove 18. As a result, because of the presence of the bearing ring 24, when the ring 23 is placed in position on the second end of the assembly member 12, bearing against the bearing ring 24, the right-hand end (in FIG. 4) of the ring 23 is offset towards the right of the shoulder 20.

The assembly process according to the invention will now be described with reference to FIG. 4. The stator members 5 and 6 (and 9, where applicable) are positioned axially after the rotor 10 has been placed in position beforehand with the openings 13 and 14 (and 15, where applicable) aligned. The assembly member 12 is then inserted into these openings. The whole unit is positioned in front of an axially immobilizable counter-bearing 25 bearing against the head 16 with the annular shoulder 17 bearing against the bearing surface 21 of the adjacent stator member 5. The bearing ring 24, followed by the ring 23 are then placed in position on the projecting second end of the assembly member 12 in the configuration shown in FIG. 4. While the counterbearing 25 is kept immobilized, an axial force in the direction of the arrow F is then exerted on a mandrel 26 comprising, starting with its working end face 27, an inwardly converging ramp surface 28 opening into an inner bore 29 whose diameter is slightly greater than the nominal diameter of the cylindrical part of the assembly member 12. By moving the mandrel 26 (by a specified axial distance) in the direction of the arrow F, the ramp surfaces 28 produce an axial compression of the ring 23 against the bearing ring 24 (and, consequently, of the whole stator member unit) with the adjacent portion (on the right in FIG. 1) of the ring 23 being pushed back into the groove 18 until an anchorage of the outer end (right in FIG. 4) of the ring against the annular shoulder 20 of the groove 18 is produced, causing the tie-rod 12 to be placed under tension and maintained under this tension, whereupon the mandrel 26 and the counter-bearing component 25 are withdrawn.

FIGS. 3 show a second embodiment of the subunit of the assembly according to the invention (also shown in FIG. 1) where, in order to reduce the production costs further, the annular shoulder 17 at the first end of the assembly member 12 consists, in this case, of a bearing ring 24', identical with the bearing ring 24 described earlier, held axially on the first end of the assembly member 12 by a split resilient ring 30 fitted into a peripheral groove 31 of corresponding size and formed in the first end of the assembly member 12, which can thus be readily produced merely by sectioning and shaping a high-tensile steel rod.

I claim:

1. An hydraulic distributor, comprising a rotor coupled rotationally with an input member and mounted rotatably between axially opposite faces of first and second stator members which are assembled under axial prestress by at least one elongate assembly member extending axially in aligned passage openings of the first and second stator members, the assembly member comprising, at a first end, an annular shoulder cooperating in bearing engagement with a bearing surface of the associated adjacent stator member, characterized in that the assembly member comprises a second end projecting axially, in assembly position, in relation to a radial bearing surface of the associated adjacent stator member and comprising a peripheral groove in which a metal ring is fitted by force with radial deformation so as to exert an axial stress on the radial bearing surface of the associated adjacent stator member, and a bearing ring disposed between the metal ring and the radial bearing surface of the associated adjacent stator member.

2. The distributor according to claim 1, characterized in that the bearing ring extends axially over a portion of said peripheral groove so that the force fitting of the metal ring results in the metal ring deforming radially into the peripheral groove.

3. The distributor according to claim 1, characterized in that the distributor comprises a spacer member inserted between the first and second stator members and penetrated by the assembly member.

4. The distributor according to claim 1, characterized in that the peripheral groove has a surface convergent in a direction away from the first end of the assembly member and forming into an annular radial shoulder facing the first end.

5. The distributor according to claim 4, characterized in that the annular shoulder at the first end of the assembly member comprises an end head integral with the assembly member.

6. The distributor according to claim 4, characterized in that the annular shoulder at the first end of the assembly member comprises a bearing ring added onto the first end of the assembly member and held on the assembly member by a retaining ring fitted into a peripheral groove formed in the first end of the assembly member.

7. A process for the assembly of an hydraulic distributor comprising a rotor and two stator members assembled under axial prestress by at least one elongated assembly member extending axially in aligned passage openings of the stator members, the assembly member comprising, at a first end, an annular shoulder for cooperating in bearing engagement with a bearing surface of the associated adjacent stator member, characterized in that the process comprises the steps of:

inserting the assembly member into the aligned passage openings in the stator members so that the annular shoulder bears against the bearing surface of the associated adjacent stator member, positioning a stationary axial bearing member against the first end of the assembly member, placing a bearing ring and a deformable ring onto a second end of the assembly member, the bearing ring disposed between a radial bearing surface of the associated adjacent stator member and the deformable ring, and the second end having a peripheral groove thereat, and applying a combined axial and radial force to the deformable ring to radially deform the deformable ring into the peripheral groove at the second end of the assembly member and thereby exert an axial stress on the radial bearing surface of the associated adjacent stator member.

8. The process according to claim 7, characterized in that the combined axial and radial force is applied to the deformable ring by a mandrel that is axially displaced, the mandrel comprising an annular ramp surface.

9. The process according to claim 8, characterized in that the deformable ring is made of mild steel.

10. The process according to claim 7, characterized in that the process further comprises the step of dimensioning axially the bearing ring so that the bearing ring extends axially over a portion of the peripheral groove whereby the combined axial and radial force imposed upon the deformable ring results in the deformable ring deforming radially into the peripheral groove.

* * * * *

UNITED STATES PATENT AND TRADEMARK OFFICE
CERTIFICATE OF CORRECTION

PATENT NO. : 4,771,809
DATED : September 20, 1988
INVENTOR(S) : NARCISO MANSILLA ANGUERA It is certified that error appears in the above-identified patent and that said Letters Patent is hereby corrected as shown below:

Cover Page, item [30], delete "555,222" and insert ---555,202---.

Signed and Sealed this

Fourth Day of July, 1989

Attest:

DONALD J. QUIGG

Attesting Officer     Commissioner of Patents and Trademarks